United States Patent
Ganguly et al.

(10) Patent No.: US 7,596,544 B2
(45) Date of Patent: Sep. 29, 2009

(54) TRACKING SET-EXPRESSION CARDINALITIES OVER CONTINUOUS UPDATE STREAMS

(75) Inventors: Sumit Ganguly, Bhopal (IN); Minos Garofalakis, Morristown, NJ (US); Rajeev Rastogi, New Providence, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 427 days.

(21) Appl. No.: 11/025,355

(22) Filed: Dec. 29, 2004

(65) Prior Publication Data

US 2006/0143218 A1 Jun. 29, 2006

(51) Int. Cl.
G06F 7/00 (2006.01)

(52) U.S. Cl. ......................................... 707/2
(58) Field of Classification Search ....................... 707/2
See application file for complete search history.

(56) References Cited

U.S. PATENT DOCUMENTS

2003/0039357 A1* 2/2003 Alten ........................... 380/46

OTHER PUBLICATIONS

Ganguly et al., SIGMOD 2003, Jun. 9-12, 2003, San Diego, CA, pp. 265-276.*
Schweller et al., IMC'04, Oct. 25-27, 2004, Taormina, Scicily, Italy, pp. 207-212.*
U.S. Appl. No. 10/954,901, filed Sep. 30, 2004, Sumit Ganguly.
U.S. Appl. No. 11/025,578, filed Dec. 29, 2004, Sumit Ganguly.
U.S. Appl. No. 11/025,211, filed Dec. 29, 2004, Sumit Ganguly.
S. Ganguly et al. entitled "Processing Data-stream Join Aggregates Using Skimmed Sketches", published online in Feb. 2004, and as pp. 569-586 in "Lecture Notes in Computer Science", vol. 2992/2004, "Advances in Database Technology—EDBT 2004: 9th International Conference on Extending Database Technology, Heraklion, Crete, Greece, Mar. 14-18, 2004", edited by Elisa Bertino et al., published by Springer-Verlag, Heidelberg, Germany, 2004.
"Sketch-Based Multi-query Processing over Data Streams" by A. Dobra et al. in "Lecture Notes in Computer Science", vol. 2992/2004, "Advances in Database Technology—EDBT 2004: 9th International Conference on Extending Database Technology, Heraklion, Crete, Greece, Mar. 14-18, 2004", edited by Bertino et al., pp. 551-568, published by Springer-Verlag, Heidelberg 2004.

(Continued)

Primary Examiner—Cheyne D Ly

(57) ABSTRACT

A method of estimating set-expression cardinalities over data streams with guaranteed small maintenance time per data-element update. The method only examines each data element once and uses a limited amount of memory. The time-efficient stream synopsis extends 2-level hash-sketches by randomly, but uniformly, pre-hashing data-elements prior to logarithmically hashing them to a first-level hash-table. This generates a set of independent 2-level hash-sketches. The set-union cardinality can be estimated by determining the smallest hash-bucket index j at which only a predetermined fraction of the b hash-buckets has a non-empty union |A∪B|. Once a set-union cardinality is estimated, general set-expression cardinalities may be estimated by counting witness elements for the set-expression, i.e., those first-level hash-buckets that are both a singleton for the set-expression and a set-union singleton. The set-expression cardinality is the set-union cardinality times the number of witness elements divided by the number of hash-buckets.

17 Claims, 4 Drawing Sheets

OTHER PUBLICATIONS

S. Ganguly et al. entitled "Processing Set Expressions over Continuous Update Streams" published in the "Proceedings of the 2003 ACM SIGMOD International Conference on Management of Data, San Diego, California, USA, Jun. 9-12, 2003", edited by A. Halevy et al. and published by Association for Computing Machinery (ACM), New York, NY 2003, ISBN 1-58113-634-X, pp. 265-276, (2003).

S. Ganguly et al, entitled "Tracking set-expression cardinalities over continuous update streams", published in The VLDB Journal: The International Journal on Very Large Databases, vol. 13, No. 4, Dec. 2004, pp. 354-369, published by Springer-Verlag, Heidelberg, 2004.

* cited by examiner

TRACKING SET-EXPRESSION CARDINALITIES OVER CONTINUOUS UPDATE STREAMS

FIELD OF THE INVENTION

The present invention relates to methods of estimating set queries, and more particularly to estimating set-expression cardinalities on multiple data-streams.

BACKGROUND OF THE INVENTION

Traditional database management systems (DBMS) deal with persistent data sets that are reliably stored and may be accessed multiple times during any query. In several important application domains, however, data arrives continuously and needs to be processed in a single pass. Such continuous data-streams arise naturally in a number of applications including telecommunication networks, retail chain transactions and banking automated teller machine (ATM) transactions.

In order to monitor these data-streams and detect patterns that may, for instance, indicate fraudulent use, equipment malfunction or non-optimal configuration, it is necessary to query these data-streams in real time using algorithms that only have access to each data element in the stream once, in the arbitrary order in which the data element appears in the data-stream. Because of the limitations of the computers doing the monitoring it is also necessary that these algorithms use only a relatively small amount of memory. Moreover, the need for real-time answers means that the time for processing each element must also be small.

Estimating the cardinality of set expressions is one of the most fundamental classes of queries. Such set expressions are an integral part of standard structured query language (SQL) queries, which supports UNION, INTERSECT and EXCEPT queries. (The SQL EXCEPT query is a set-difference query).

In order to calculate set-expression cardinality, standard SQL programs make multiple passes over complete sets of stored data. Such algorithms are not capable of providing answers to such queries when the data arrives in the form of streaming data, without storing all the data.

SUMMARY OF THE INVENTION

Briefly described, the present invention is a method of efficiently providing estimates of set-expression cardinalities over a number of input data-streams in a way that guarantees a small, logarithmic maintenance time per data-element update. The method is capable of processing the cardinality of all the SQL standard set queries, i.e., set-union, set-intersection and set-difference, only examines each data element in the data-stream once, uses a limited amount of computer memory, is effective on large volumes of data and can be used on streams of updates, i.e., data-streams having both insertions and deletions.

In a preferred embodiment of the present invention, a novel optimized, time-efficient stream synopsis extends 2-level hash-sketch methods by randomly, but uniformly, pre-hashing the data-elements to a random hash-table prior to logarithmically hashing them to a first-level hash-table. The random pre-hashing allows a set of 2-level hash-sketches on parts of the input data-streams to be generated in a way that simplifies their maintenance, so that, upon the arrival of each new data-element, only one hash-sketch needs to be updated. This guarantees logarithmic maintenance time per update, making the method applicable for rapid-rate data streams.

A set-expression can be evaluated using the time-efficient stream synopsis by first obtaining an estimate for the set-union cardinality of the sets involved in the set-expression.

The set-union cardinality can be estimated using the independent 2-level hash sketches because the probability p that one or other of a first-level hash-bucket pair of index j contain a distinct element after u distinct trials is given by $p=1-(1-1/R_j)^u$, where $R_j=2^{j+1}$. Substituting and rearranging yields $u=\log(1-p)/\log(1-1/R)$.

An estimate of the probability p can be obtained by determining the smallest first-level hash-bucket index j at which only a predetermined fraction of the b hash-buckets has a non-empty union $|A \cup B|$. This number c of non-empty hash-buckets can be used to estimate probability p as c/b. The estimate for the set-union cardinality $|A \cup B|$ is then $\log(1-c/b)/\log(1-1/2^{j+1})$.

Once a robust estimate for a set-union cardinality is calculated, that estimate can be used to obtain an approximate answer to general set-expression cardinalities by counting appropriate witness elements for the set-expression in the time-efficient stream synopsis.

A witness element is a first-level hash-bucket that is both a non-empty singleton for the set-expression being estimated and is also a singleton for the union of the sets involved in the set-expression. If $|E|$ represents the cardinality of a set-expression E, and $|U|$ represents the cardinality of the union of sets involved in E, then the probability $p_E$ of finding a witness of the set-expression among the singletons for the set-union can be shown to be $p_E=|E|/|U|$.

An estimate for $p_E$ can be obtained by counting the number of witness elements s' as a proportion of the total number of hash buckets s that are singleton for a union over the corresponding first-level sketches at an appropriate hash index.

The estimate of the set-expression cardinality $|E|$ is then given by $|U| \cdot s'/s$.

These and other features of the invention will be more fully understood by references to the following drawings.

DETAILED DESCRIPTION

Figure 1:
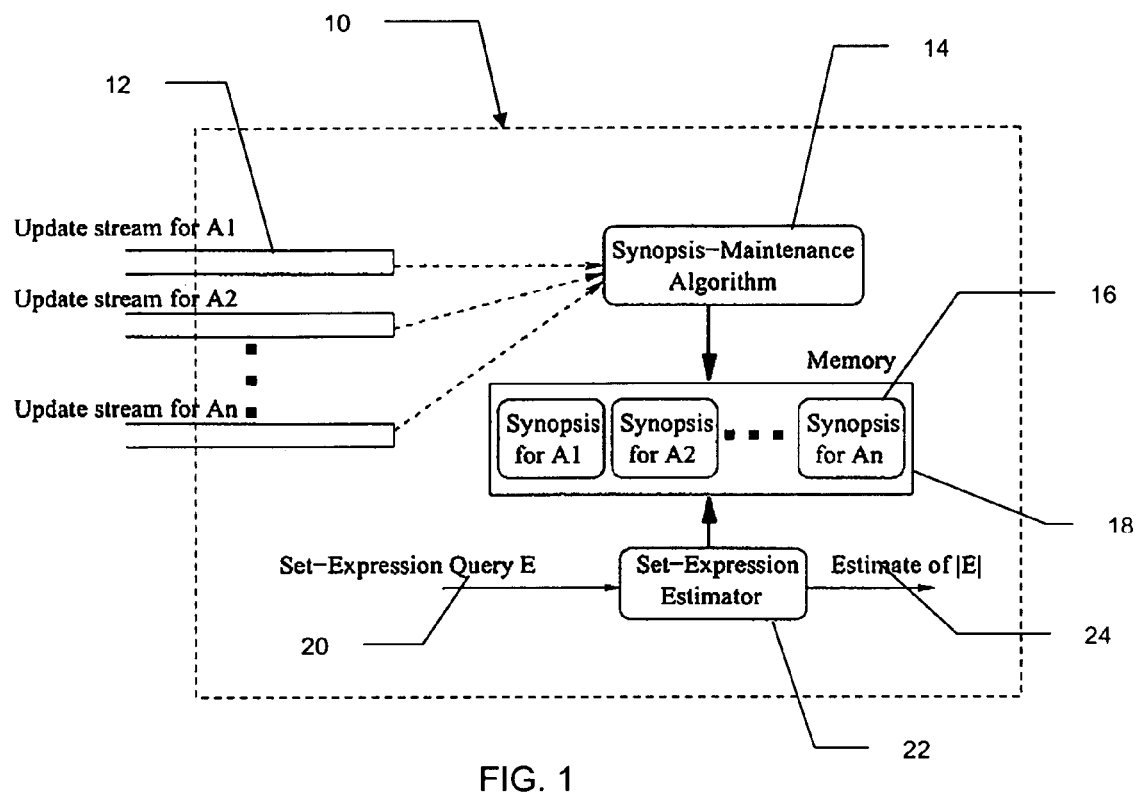
FIG. 1 is a schematic representation of an update stream processing architecture.

The present invention relates to methods of efficiently providing estimated answers to set-expression cardinalities over multiple data-streams in a way that guarantees a small, logarithmic maintenance time per data update. Furthermore, the methods are space efficient, deal with full fledged set-expressions, including the SQL standard UNION, INTERSECTION and DIFFERENCE queries, and operate on general data-streams, including update streams having deletion and insertion operations. As with all effective data-stream methods, the methods only need to examine each data element once and may provide the estimate in real time using limited computer memory.

Estimating the cardinality of set expressions is one of the most fundamental classes of query, and it is highly desirable to be able to answer this class of queries defined over several, distributed updatable data-streams. Questions of interest include queries such as, but not limited to, "what is the number of distinct Internet Protocol (IP) source addresses seen in passing packets of information from two routers R1 and R2 but not from a third router R3?"

It is, therefore, highly desirable to be able to estimate the cardinality of such set expressions over a number of input data-streams and provide reasonably accurate approximate answers to the queries when the data is arriving in a data-stream and each data element can only be examined once. The processing algorithms need to be capable of dealing with all forms of set-expression queries, including set-expressions comprising one or more set union, set intersection and set difference operators, and the answer needs to be provided in real time using limited computer memory.

Furthermore, it is highly desirable that the time to process each data-element as it arrives is small, as in a rapid-rate update data environment, the limiting resource may not be the computer memory available to store data required for the estimate but may be the time required to update the stored data In the present invention, a 2-level hash sketch synopsis data structure is used to provide low-error ($\epsilon$), high confidence ($\delta$) estimates for set-expression cardinalities, including set-union, set-intersection and set-difference cardinalities, over continuous update streams, i.e., data-streams having both insertions and deletions of data-elements, in a single pass as described in detail in, for instance, the article written by S. Ganguly et al. entitled "Processing Set Expressions over Continuous Update Streams" published in the "Proceedings of the 2003 ACM SIGMOD International Conference on Management of Data, San Diego, Calif., USA, Jun. 9-12, 2003", edited by A. Halevy et al. and published by Association for Computing Machinery (ACM), New York, N.Y. 2003, ISBN 1-58113-634-X, pp 265-276, the contents of which are hereby incorporated by reference, and hereinafter referred to as "Ganguly et al. I".

A practical problem with the methods detailed in Ganguly et al. I is that all the independent 2-level hash sketch structures have to be updated for each new data-element that arrives. The time required to maintain the synopsis is, therefore, essentially proportional to the number of sketches. As the accuracy of the estimation is also dependent on the number of independent 2-level hash sketches, there are a significant number of them and the maintenance time per update is significant.

Having a synopsis that takes a significant time to update is a problem in a rapid-rate update data environment, where the limiting resource may not be the computer memory available for storing sketches but may instead be the synopsis update time. In a preferred embodiment of the present invention, a novel optimized, time-efficient stream synopsis that extends the 2-level hash sketches of Ganguly et al I is used to provide estimated set-expression cardinalities with strong accuracy space guarantees, while requiring only logarithmic maintenance time per update, making it applicable for rapid-rate data streams. This novel optimized, time-efficient stream synopsis is described in detail in, for instance, the article by S. Ganguly et al, entitled "Tracking set-expression cardinalities over continuous update streams", published in The VLDB Journal: The International Journal on Very Large Databases, Vol. 13, No. 4, December 2004, pp. 354-369, published by Springer-Verlag, Heidelberg, 2004, the entire contents of which are hereby incorporated by reference, and which is hereinafter referred to as Ganguly et al II.

Before describing this preferred embodiment, an exemplary embodiment that illuminates the basic concepts used in estimating set-expression cardinalities with sketch synopses will be described in detail by reference to the accompanying figures in which, as far as possible, like numbers represent like elements.

FIG. 1 is a schematic representation of an update stream processing architecture 10, comprising data-streams 12, a synopsis maintenance algorithm 14, a synopsis 16 for each data-stream 12, a computer memory 18, a set-expression cardinality query 20, a set-expression estimator 22 and an estimated answer 24 to the query. The synopsis 16 is stored on the computer memory 18.

The $A_{1...n}$ data-streams 12 are all unordered sequences of elements. The element values may themselves be vectors or have vectors associated with them. These vectors may include values that indicate if the data elements are to be inserted or deleted from the respective data-streams.

In contrast to conventional database management systems (DBMS), the synopsis maintenance algorithm 14 only sees each data element in streams 12 once and in the fixed order in which the elements happen to arrive. The order of element arrival in each stream is arbitrary, and elements with duplicate values can occur anywhere over the duration of the stream.

The computer memory 18 is small compared to the number of data elements in the data-streams and is used to maintain a concise and accurate synopsis of each data-stream 12. The main constraints on each synopsis are (1) that it is much smaller than the total number of data elements (also known as "tuples") in the data stream, in particular that its size is logarithmic or poly-logarithmic with respect to the size of the data-stream, (2) that the synopsis can be computed in a single pass over the tuples in the data-stream, in any, arbitrary order of their arrival and (3) that the time to update each synopsis is small. Furthermore, at any point in time, the set-expression estimator 22 must be able to combine the maintained synopses to produce an approximate answer to a set-expression cardinality query 20.

Figure 2:
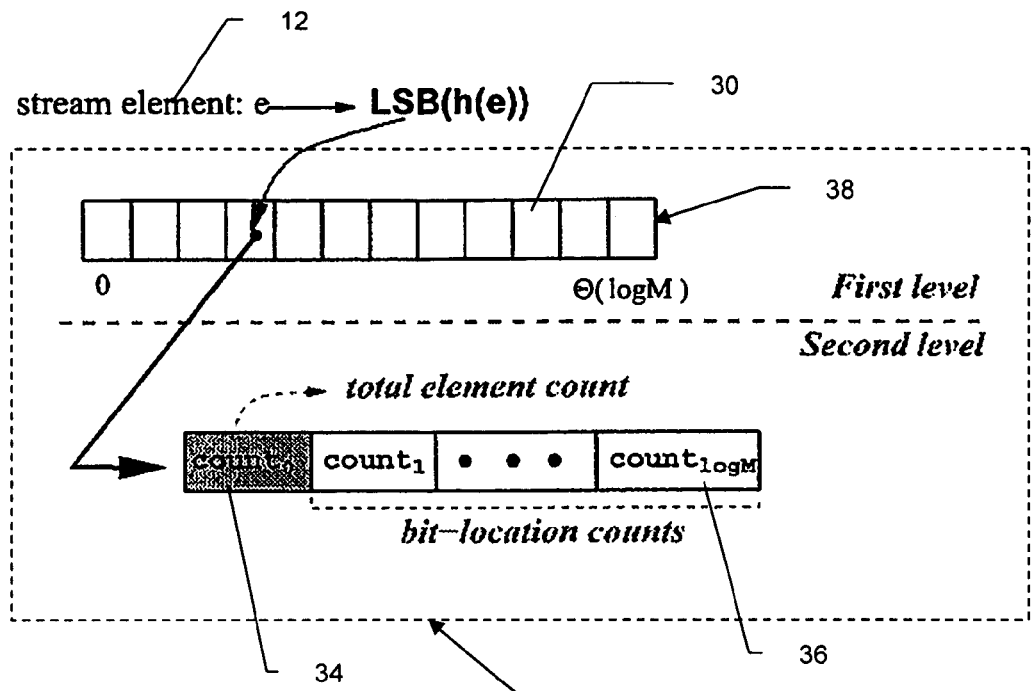
FIG. 2 is a schematic representation of a basic 2-level hash sketch synopsis data structure.

FIG. 2 shows a schematic representation of a 2-level hash-sketch 28, described in detail in Ganguly, comprising a first-level hash-table 38 having hash-buckets 30 and a counter array 32 for each hash-bucket 30. The counter array 32 comprises a total element count 34 and one or more bit location counts 36. A data-element e from data-stream 12 is hashed to a hash-bucket 30 using a hash function h. The mapping to hash-buckets may operate on the least significant bits of the hash function $h_v$ image, i.e. on the least significant bit of the result of the data-element e after it has been operated on by the hash function. Hash-table 38 has O(log M) hash-buckets 30, where M is the size of the domain of the data-elements e. Hash function h is chosen so that the probability of hashing to a particular hash-bucket 30 decreases exponentially with the index of the hash-bucket 30, as detailed in, for instance, Ganguly et al. I & II.

For the collection of elements mapping to a particular hash-bucket 30, a counter array 32 is maintained. The counter array 32 comprises a total element count 34, which tracks the net total number of data-elements e that map into that bucket, and log(M) bit location counts 36. The bit location count 36 records the total number of "1" bits for each particular bit in the binary representations of the data-elements e that map into the bucket.

The algorithm for maintaining a 2-level hash-sketch 28 synopsis over a stream of updates is fairly simple. The sketch structure is first initialized to all zeros and, for each incoming update <i, e, $^+$_v>, (i.e., data element in stream i having domain value e being either an insertion or deletion of value v), the element counters at the appropriate locations of the sketch are updated, as detailed in, for instance, Ganguly et al. I & II.

The set-expression estimator 22 relies on checking certain elementary properties of the 2-level hash sketch 28, including if a bucket is empty, if the bucket contains a singleton, i.e., if only one distinct element has been mapped to the bucket, as well as checking properties between two sketch synopses on different data-streams, such as checking if corresponding hash-buckets for the two data-streams are identical singleton buckets, or if the union of the corresponding hash-buckets is a singleton. Exemplary algorithms for obtaining these elementary properties will now be described in detail by reference to the following procedures.

TABLE 1

Procedure EmptyBucket procedure EmptyBucket( $\chi$, i )
Input: 2-level hash sketch $\chi$, first-level bucket index i.
Output: true iff $i^{th}$ bucket of $\chi$ is empty.
begin
1.      if ($\chi[i, 0] = 0$) return(true)
2.      else return(false)
end Procedure EmptyBucket simply examines the i th hash-bucket of a 2-level hash-sketch $\chi$ and, if the total element count 34 is zero, reports that the bucket is empty.

TABLE 2

Procedure SingletonBucket procedure SingletonBucket( $\chi$, i )
Input: 2-level hash sketch $\chi$, first-level bucket index i.
Output: true iff $i^{th}$ bucket of $\chi$ is a singleton.
begin
1.      if (EmptyBucket($\chi$, i)) return(false) // bucket is empty
2.      unique := true; j := 1
3.      while ( unique and j $\leq$ log M ) do
4.         if ( $\chi[i, j] > 0$ and $\chi[i, 0] > \chi[i, j]$ ) then
5.           unique := false // at least two elements in bucket
6.         j := j + 1
7.      endwhile
8.      return(unique)
end Table 2 shows the steps of the procedure SingletonBucket which checks to see if a particular first-level hash-bucket 30 is a singleton. A singleton hash-bucket is one that contains only one distinct element, i.e., one or more occurrences of the same data-element e.

In line 1, procedure SingletonBucket first uses procedure EmptyBucket to check that the hash-bucket 30 is not empty. If the hash-bucket 30 is not empty, procedure SingletonBucket continues by checking the counter array 32 associated with the hash-bucket 30. The total element count 34 is represented by $\chi[i, 0]$ and the log(M) bit location counts 36 are represented by $\chi[i, 1] \ldots \chi[i, \log(M)]$ where i is the hash-bucket index. In steps 3-7, procedure SingletonBucket loops through the bit location counts 36. If all the bit location counts 36 are either zero or equal to the total element count 34, then the hash-bucket 30 contains a singleton, i.e., it contains one or more instances of a single, distinct data-element e.

TABLE 3

Procedure IdenticalSingletonBucket procedure IdenticalSingletonBucket( $\chi_A, \chi_B$, i )
Input: 2-level hash sketches $\chi_A, \chi_B$, first-level bucket index i.
Output: true iff the $i^{th}$ buckets in $\chi_A$ and $\chi_B$ contain the
    same singleton element.
begin
1.      if (not SingletonBucket($\chi_A$, i)) or
         (not SingletonBucket($\chi_B$, i)) then
2.         return(false)
3.      same := true; j := 1
4.      while ( same and j $\leq$ log M ) do
5.         if ( ($\chi_A[i, j] > 0$) $\neq$ ($\chi_B[i, j] > 0$) ) then
6.           same := false // differ in at least one bit-location
7.         j := j + 1
8.      endwhile
9.      return(same)
end Table 3 shows the steps of the procedure IdenticalSingletonBucket. This procedure checks a pair of corresponding hash-buckets 30 in two 2-level hash-sketches, built over two distinct data-streams 12 to see if they contain identical singletons. In step 1, the procedure first uses procedure SingletonBucket to check that both hash-buckets 30 contain singletons. In step 4-7, procedure IdenticalSingletonBucket loops through the two counters 32 contained in the corresponding pair of hash-buckets 30 and checks that each of the corresponding bit-location counts 36 is identical, and reports an identical singleton if this condition is satisfied.

TABLE 4

Procedure SingletonUnionBucket procedure SingletonUnionBucket( $\chi_A; \chi_B$, i )
Input: 2-level hash sketches $\chi_A, \chi_B$, first-level bucket index i.
Output: true iff the union of $i^{th}$ buckets in $\chi_A$ and $\chi_B$ is a
    singleton.
begin
1.      if ( (SingletonBucket($\chi_A$, i) and EmptyBucket($\chi_B$, i))
        or (SingletonBucket($\chi_B$, i) and EmptyBucket($\chi_A$, i)) )
      then
2.         return(true) // one singleton and one empty bucket
3.      else return(IdenticalSingletonBucket($\chi_A, \chi_B$, i))
end Table 4 shows the steps of procedure SingletonUnionBucket which checks a pair of corresponding hash-buckets 30 in two 2-level hash-sketches built over two distinct data-streams 12 to see if the union of the two hash-buckets is a singleton. This can occur either if one of the hash-buckets contains a singleton and the other is empty, which is checked for in lines 1, or if the two hash-buckets both contain the same singleton, which is checked for in line 3 using the procedure IdenticalSingletonBucket.

These elementary property checks can be used as basic steps in estimating set-expression cardinalities over data-streams, such as the set-union cardinality. The set-union cardinality $|A \cup B|$ of sets A and B may be defined as the number of distinct elements with positive net frequency in either A or B.

An estimate of the set-union cardinality of data-streams A and B can be obtained using 2-level hash-sketch synopses $\chi_A$ and $\chi_B$, with an error $\epsilon$ and a confidence $\delta$ by considering the following analysis, which is proved in Ganguly.

First, build a family of r independent 2-level hash-sketch pairs in parallel over A and B, each using independently chosen hash functions h, and in which each parallel pair uses the same hash function. Then determine the smallest first-level index of hash-bucket 30 at which only a predetermined fraction of the r hash-buckets has a non-empty union $|A \cup B|$. This number of non-empty hash-buckets can be used to estimate the set-union cardinality.

The estimate is possible because for any given hash-bucket of index j in the hash-table 38, the hash function h has been selected so that the probability of an element hashing to that bucket is $1/2^{j+1}$. Or if we use the substitution $R_j = 2^{j+1}$, the probability may be represented as $1/R_j$. The probability that any element does not hash to a given hash-bucket of index i is therefore $1 - 1/R_j$. After u distinct elements have been hashed, the probability that none has hashed to a particular bucket, i.e., that the bucket is empty is $(1 - 1/R_j)^u$. Therefore, the probability that a particular bucket is non-empty, i.e., that it contains at least one distinct element, is $1 - (1 - 1/R_j)^u$.

Therefore, the probability p that one or the other hash-bucket of a hash-bucket pair of index j is non-empty after u distinct trials, where u is the number of distinct elements in the sets A and B, i.e., $u = |A \cup B|$, is given by $p = 1 - (1 - 1/R_j)^u$, where $R_j = 2^{j+1}$. Substituting and rearranging yields $u = \log(1 - p)/\log(1 - 1/R)$.

An estimate of the probability p that one or the other of a hash-bucket pair of index j is non-empty can be obtained by counting the number c of non-empty hash-buckets at a particular index level j, and dividing by the number of independent hash-sketches r that have been used, i.e., $p = c/r$. By making the number of independent hash-sketches $r = O((\log(1/\delta)/\epsilon^2)$, and selecting the lowest indexed hash-level at which the number of non-empty bucket counts is less than or equal to $(1 + \epsilon)r/8$, an estimate with error $\epsilon$ and confidence $\delta$ can be obtained, as detailed in, for instance, Ganguly.

TABLE 5

Procedure SetUnionEstimator.

procedure SetUnionEstimator( $\{\mathcal{X}_A^i, \mathcal{X}_B^i : i = 1, ..., r\}, \epsilon$ )

Input: r independen2-level hash sketch pairs $\{\mathcal{X}_A^i, \mathcal{X}_B^i\}$ for streams A and B, relative accuracy parameter $\epsilon$.
Output: Estimate for $|A \cup B|$.
begin
1.    f := (1 + $\epsilon$)r/8
2.    index := 0
3.    while ( true ) do
4.       count := 0
5.       for i := 1 to r do
6.          if ( not EmptyBucket($\mathcal{X}_A^i$, index) ) or
                ( not EmptyBucket($\mathcal{X}_B^i$, index) ) then
7.            count := count +1
8.       endfor
9.       if (count $\leq$ f) then break // first index s.t. count $\leq$ f
10.     else index := index +1
11.  endwhile
12.  $\hat{p}$ := count / r ; R := $2^{index+1}$
13.      return$\left( \dfrac{\log(1 - \hat{p})}{\log(1 - 1/R)} \right)$
end Table 5 shows the steps of procedure SetUnionEsimator. Procedure SetUnionEstimator estimates the set-union over a pair of data-streams A and B by taking r independent 2-level hash-sketch pairs built in parallel for both data-streams A and B. In step 1, the procedure calculates a pre-determined count limit f based on the required error $\epsilon$ and the number of independent hash-sketches r. The procedure then starts with the lowest indexed hash-buckets and counts the number of corresponding pairs of hash-buckets over data-stream A and B for which either of the hash-buckets is not empty. The counter count is incremented each time this condition is satisfied. In step 9, the procedure checks to see if count is less than or equal to f. If not, the procedure increments the hash index and repeats the process at the next level of hash buckets. If count is of the right size, then in step 12, the procedure estimates the probability as p=count/r and sets $R = 2^{index+1}$. In step 13, the procedure then returns an estimate of the set-union cardinality, i.e., estimated as $|A \cup B| = \log(1-p)/\log(1-1/R)$.

As described in detail in for instance, Ganguly, once a robust estimate for a set-union cardinality is calculated, that estimate can be used to estimate general set-expression cardinalities by counting appropriate witness elements for the set-expression in the hash-sketch synopses. A witness element is a hash-bucket that is both a non-empty singleton for the set-expression being estimated and is also a singleton for the union of the sets involved in the set-expression.

If $|E|$ represents the cardinality of a set-expression E, and $|U|$ represents the cardinality of the union of sets involved in E, then the probability $p_E$ of finding a witness of the set-expression among the singletons for the set-union can be shown to be $p_E = |E|/|U|$, as detailed in, for instance, Ganguly.

Having found an estimate for the set-union cardinality $|U|$, an appropriate hash index level j at which to count witness elements in the r independent 2-level hash-sketches can be shown to be given by the expression $j = \lceil \log((\beta \cdot u)/(1\epsilon)) \rceil$, where $\beta$ is a constant that is greater than one and u is the estimate of $|U|$.

TABLE 6

Procedure AtomicDiffEstimator.

procedure AtomicDiffEstimator( $\mathcal{X}_A^i, \mathcal{X}_B^i, \hat{u}, \epsilon$ )
begin
1.    index := $\left\lceil \log\left( \dfrac{\beta \cdot \hat{u}}{1 - \epsilon} \right) \right\rceil$   // $\beta$ is constant > 1 (see analysis)
2.    if ( not SingletonUnionBucket($\mathcal{X}_A^i, \mathcal{X}_B^i$, index) ) then
3.       return( noEstimate)
4.    estimate := 0
5.    if ( SingletonBucket($\mathcal{X}_A^i$, index) and
        EmptyBucket($\mathcal{X}_B^i$, index) ) then
6.       estimate := 1     // found witness of A – B
7.    return( estimate )
end Table 6 shows the steps in procedure AtomicDiffEstimator that examines two 2-level hash-sketch synopses $\chi_A$ and $\chi_B$, for witness elements for the set-difference cardinality $|A-B|$, i.e., the number of distinct element values whose net frequency is positive in set A and zero in set B. The witness element for this set-expression cardinality are the corresponding pairs of hash-bins which are both singletons for the union of A and B and singletons for the difference of A and B, i.e., singletons for A and empty for B.

In line 1 of AtomicDiffEstimator an appropriate index level at which to examine the corresponding first-level hash-buckets is calculated.

In line 2, the procedure SingletonUnionBucket is used to check that the pair of hash-buckets selected is singleton for the union of A and B. If this condition is satisfied, then the data-stream A hash-sketch synopsis is examined to see if it is a singleton, while the data-stream B hash-sketch synopsis is examined to see if it is empty. If this condition is also satisfied, then this pair of hash-buckets is indicated as being a witness element for the set-difference of the data-streams.

TABLE 7

Procedure SetDifferenceEstimator procedure SetDifferenceEstimator($\{\chi_A^i, \chi_B^i : i = 1,\ldots, r\}, \hat{u}, \epsilon$)
Input: r independent 2-level hash sketch pairs $\{\chi_A^i, \chi_B^i\}$ for
    streams A and B, set-union cardinality estimate $\hat{u}$, relative
    accuracy parameter $\epsilon$.
Output: Estimate for $|A - B|$.
begin
1.        sum := count := 0
2.        for i := 1 to r do
3.           atomicEstimate := AtomicDiffEstimator($\chi_A^i, \chi_B^i, \hat{u}, \epsilon$)
4.           if ( atomicEstimate ≠ noEstimate) then
5.               sum := sum + atomicEstimate; count := count + 1
6.           endif
7.        endfor
8.        return( sum × $\hat{u}$ / count )
end Table 7 shows the steps of procedure SetDifferenceEstimator which estimates the cardinality of the set-difference of data-streams A and B, given r independent 2-level hash-sketch pairs for the streams, a set-union cardinality estimate and a required relative accuracy parameter.

In steps 2-7, procedure SetDifferenceEstimator loops through the r independent hash-sketch pairs, and uses procedure AtomicDiffEstimator to count witness events for the set-difference at the appropriate hash index level.

In step 8, an estimate of the set-difference cardinality is returned as the calculated probability of witness events, i.e., the number of witness events found divided by the number of discovered singletons for the set-union of A and B, multiplied by the set-union estimate for the two data-streams.

A similar procedure can be used for other set-expressions by selecting the appropriate witness conditions. For instance, to estimate the set-intersection cardinality of the data-streams A and B, only step 5 of the procedure AtomicDiffEstimator needs to be altered to read: "if (SingletonBucket($\chi_A$) and SingletonBucket($\chi_B$)) then" to obtain a procedure for an atomic set-intersection estimation algorithm, which may be called AtomicInstersectEstimator.

The estimation procedure described above can, in fact, be generalized to formulate estimations for the cardinality of general set-expressions over a collection of update streams $A_i$, $I=1, \ldots, n$. Such set expressions are of the generic form $E:=(((A_1 \text{op}_1 A_2) \text{op}_2 A_3) \ldots A_n)$, where the connectives $\text{op}_j$ denote the standard set operators, namely, union, intersection and set difference.

The general set-expression estimator is similar to the set-difference and set-intersection algorithms. First, a robust estimate of the set-union cardinality over all the streams participating in the set-expression E to be estimated, is obtained. This estimate of set-union cardinality is used to select an appropriate first-level hash bucket index to use. The general set-expression estimation then discards all parallel 2-level hash sketch collections for which the bucket is not singleton over the set-union. As detailed in Ganguley et al 1 and II, the set expression is then transposed into a Boolean condition B(E) using the following definitions, in which B(E) is true if the bucket to which it refers is non-empty:

$E=E_1 \cup E_2$: Define B(E):=$B(E_1) \vee B(E_2)$ (i.e., the disjunction of the sub-expressions $B(E_1)$ and $B(E_2)$);

$E=E_1 \cap E_2$: Define B(E):=$B(E_1) \wedge B(E_2)$ (i.e., the conjunction of the sub-expressions $B(E_1)$ and $B(E_2)$); and $E=E_1-E_2$: Define B(E):=$B(E_1) \wedge \text{NOT}(B(E_2))$ (i.e., must satisfy $B(E_1)$ but not $B(E_2)$).

The Boolean condition B(E) essentially corresponds to the witness condition described above.

The cardinality of the expression |E| can then be estimated, because, as proved in Ganguley et al 1 and II, the probability $p_E$ that the witness condition is true is given, at a given hash index level, by the ratio of the probability of a bucket being a non-empty singleton for the set-expression over all the data-streams over the probability of the bucket being a set-union singleton over al the data-streams, which in turn can be shown to be equal to the set-expression cardinality over the set-union cardinality, i.e., |E|/|U|. As, using algorithms essentially similar to those detailed above, the first-level hash functions can be used to find an estimate for $p_E$, and |U| can also be estimated in a similar fashion, |E| can be estimated.

A problem with the methods discussed so far, all of which employ a collection of 2-level hash sketches for set-expression estimates over update streams, is that the time required to maintain the stream synopsis for each arriving update is essentially proportional to the number r of independent 2-level hash sketches. This is due to all the independent 2-level hash sketch structures having to be updated on the arrival of each data-element.

Reducing the time taken to update the synopsis for each new data-element is particularly important in rapid-rate data-stream processing environments and when estimates are required in real-time.

In a preferred embodiment of the present invention, a time efficient hash-sketch stream synopsis, in which the data-elements are randomly pre-hashed, is used to provide estimates to set-expression cardinalities. The random pre-hashing allows the necessary set of 2-level hash-sketches on parts of the input stream to be generated in a way that their maintenance is simplified, so that on the arrival of each new data-element, only one hash-sketch needs to be updated.

Figure 3:
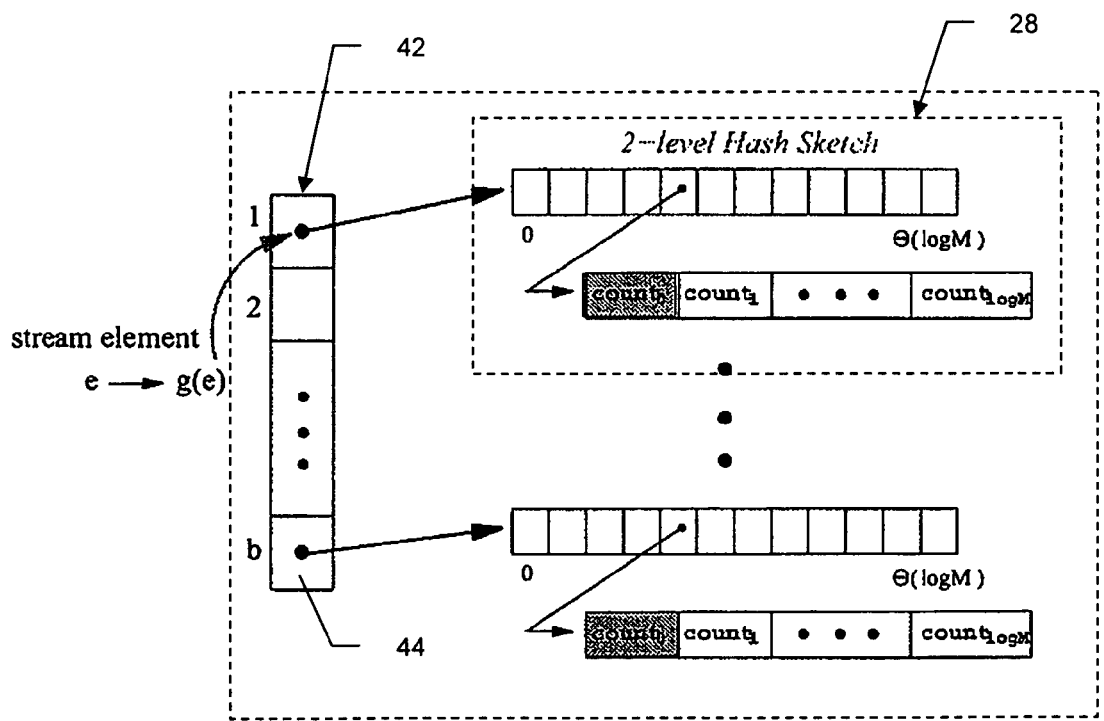
FIG. 3 is a schematic representation of a time-efficient hash-sketch stream synopsis.

FIG. 3 is a schematic representation of the time efficient hash-sketch stream synopsis 40, comprising a random hash-table 42, having b random hash-buckets 44, and b associated 2-level hash-sketches 28. A hash function g maps the data-elements e randomly to one of the b random hash-buckets 44.

A 2-level hash-sketch 28 is maintained for each of the b random hash-buckets 44. Data-elements that hash to each random-hash bucket 44 are then hashed to the corresponding 2-level hash-sketch 28 using a hash function h. The mapping to hash-buckets may operate on the least significant bits of the hash function $h_v$ image, i.e. on the least significant bit of the result of the data-element e after it has been operated on by the hash function. Hash-table 38 has O(log M) hash-buckets 30, where M is the size of the domain of data-elements e. Hash function h is chosen so that the probability of hashing to a particular hash-bucket 30 decreases exponentially with the index of the hash-bucket 30.

For the collection of elements mapping to a particular hash-bucket 30, a counter array 32 is maintained. The counter array 32 comprises a total element count 34, which tracks the net total number of data-elements e that map into that bucket, and log(M) bit location counts 36. The bit location counters count the total number of a particular bit of a binary representation of the data-element e that maps into the bucket.

The algorithm for maintaining the time efficient hash-sketch stream synopsis 40 requires that only one 2-level hash-sketch has to be updated for each arriving data element. Thus, even though the synopsis may still comprise a large number of 2-level hash sketches, spread across the b hash-buckets, only one sketch needs to be updated for each arriving data-element, guaranteeing a small, logarithmic update time.

The set-expressions can be evaluated in a manner similar to that described before, except that now the algorithms iterate over sketches built over the b randomly generated portions of the data-streams, rather than the r independent sketches built over the entire data-streams.

To obtain an estimate of the set-union cardinality, the algorithm SetUnionEstimator in table 5 may be used, but with the lower bound in step 1 calculated using b rather than r, and with the iteration in step 5 being over the b randomly generated 2-level hash-sketches rather than over the r independently replicated hash-sketches. Similarly in step 12, the probability is then the count divided by b.

TABLE 8

Procedure BucketDiffEstimator.

procedure BucketDiffEstimator($\mathcal{X}_A[i], \mathcal{X}_B[i], \hat{u}, \epsilon$ )
begin
1. $\quad \text{index} := \left\lceil \log\left( \frac{2 \cdot \hat{u}}{b \, (1-\epsilon)^2} \right) \right\rceil$
2. $\quad$ if ( not SingletonUnionBucket($\mathcal{X}_A[i], \mathcal{X}_B[i]$, index) ) then
3. $\quad\quad$ return( noEstimate)
4. $\quad$ estimate := 0
5. $\quad$ if ( SingletonBucket($\mathcal{X}_A[i]$, index) and
$\quad\quad\quad$ EmptyBucket($\mathcal{X}_B[i]$, index) ) then
6. $\quad\quad$ estimate := 1     // found witness of A − B
7. $\quad$ return( estimate )
end Table 8 shows the steps of procedure BucketDiffEstimator. The main difference between procedure BucketDiffEstimator and the related procedure AtomicDiffEstimator, is in line 1. in which the index of the hash-buckets to examine is calculated. As detailed in Ganguly, this difference is due, in part, to the fact that the various portions of the set-union cardinality $u_i$ mapping to each hash bucket i over the time-efficient hash sketch synopsis are, due to the randomizing properties of the g hash function, themselves random variables, leading to different requirements on the number of independent hash-sketches b required to satisfy the error and confidence requirement of the cardinality estimate. These differences result in the index choice shown in line 1 of procedure BucketDiffEstimator, as detailed in Ganguly et al. II.

TABLE 9

Procedure HashDifferenceEstimator procedure HashDifferenceEstimator( $\chi_A, \chi_B, \hat{u}, \epsilon$ )
Input: Time-efficient hash-sketch synopses pair $\chi_A, \chi_B$ (each
$\quad$ comprising b buckets) for streams A and B, set-union
$\quad$ cardinality estimate $\hat{u}$, relative accuracy parameter $\epsilon$.
Output: Estimate for |A − B|.
begin
1. $\quad$ sum := count := 0
2. $\quad$ for i := 1 to b do
3. $\quad\quad$ bucketEstimate := BucketDiffEstimator($\chi_A[i], \chi_B[i], \hat{u}, \epsilon$)
4. $\quad\quad$ if ( bucketEstimate ≠ noEstimate) then
5. $\quad\quad\quad$ sum := sum + bucketEstimate; count := count +1
6. $\quad\quad$ endif
7. $\quad$ endfor
8. $\quad$ return( sum × $\hat{u}$ / count )
end Table 9 shows the steps of procedure HashDifferenceEstimator. This procedure takes two time-efficient hash-sketch synopses pairs, each having b random hash-buckets, a set-union cardinality estimate for the two data-streams and a required relative accuracy parameter. Using the procedure BucketDiffEstimator, HashDifferenceEstimator counts the number of witness elements for the set-difference condition at the appropriate hash-bucket index level. In line 8, the estimate of the set-difference cardinality is returned as being equal to the set-union estimate multiplied by the number of witness elements found and divided by the number of discovered elements at are singleton for set-union in the b hash buckets.

Similar procedures allow the time-efficient hash-sketch synopses to be used for estimating general set-expression cardinalities, including set-intersection cardinalities by making sure that line 5 of BucketDiffEstimator is changed to reflect the set-expression being estimated. For instance, in the case of a set-intersection cardinality, line 5 of procedure BucketDiffEstimator should be changed to read: "if(SingletonBucket $\chi_A[i]$ and SingletonBucket $\chi_B[i]$" to reflect locating a singleton in the set-intersection of the hash-bin pairs, and therefore, as the union of the two buckets has already been determined to be a singleton in line 2, is a witness element for the set-intersection cardinality.

The hash based method can be generalized to obtain estimates for cardinalities of generalized set-expressions as detailed above. The general method for estimating a set-expression cardinality over one or more update streams essentially begins by randomly hashing one or more data elements from said update streams to on or more random hash tables having random hash buckets. The data elements are then logarithmically hashed from the random hash buckets to a logarithmic hash table. A probability of the corresponding logarithmic hash bins being singleton union at a selected logarithmic hash table index level is then measured.

Using this probability of corresponding logarithmic hash bins being singleton union and the selected index level, an estimate of the set-union cardinality over the data-streams can be made, as detailed above. Then, by measuring the probability of corresponding hash bins being singleton set-expressions and singleton union at a second selected logarithmic hash table index level, an estimate of the set-expression cardinality over the data-streams can be made using said probability of the corresponding hash bins being singleton set-expression and singleton union and the estimated set-union cardinality, as detailed above and in Gangule et al. II.

For two data streams, the method consists essentially of creating a two hash-sketch synopsis each of which has a random hash-table and a first-level hash table for each hash-bucket of the random hash-tables. These hash-sketch synopsis may be maintained by using the data elements from their respective data-streams. By obtaining a set-expression singleton count over both hash-sketches, and estimate of the set-expression cardinality can be made.

As described above, creating the hash-sketch synopsis includes creating a 2-level hash sketch for each of the random hash-tables, the 2-level hash sketch essentially being the first-level hash-table, and a counter array for each hash-bucket of the first-level hash-table. The sketch maintenance comprises randomly hashing data elements from the data-element domain, or data-stream, to the random hash-buckets, and then logarithmically hashing the data-element from the random hash-bucket to the first-level hash-buckets. The logarithmic hash functions are selected so that the probability of logarithmically hashing a data-elements to a first-level hash-bucket decreases exponentially with the index of the first-level hash-bucket. The logarithmic hashing may comprise mapping to a logarithmic hash-bucket using a least significant bit of a binary representation of a logarithmic hash image of the data-element, as detailed in Ganguley et al. II.

Figure 4A:
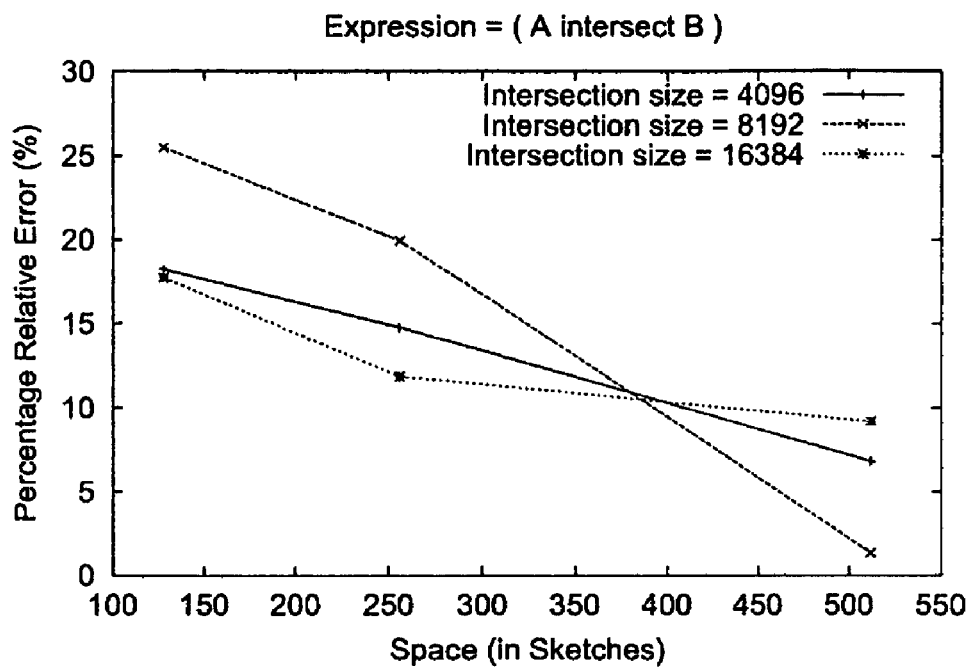
FIGS. 4a-c show experimental results giving the average relative error in estimating a) set-intersection cardinality, b) set-difference cardinality and c) in evaluating the set-expression cardinality for the set-expression $|(A-B) \cap C|$.

FIG. 4a shows experimental results of using the 2-level hash-sketches to estimate set-intersection cardinality |A∩B| between two data streams. The graph shows the relative error of the estimate plotted against the space used to store sketches, measured in sketches, for three different expression sizes. The relative error decreases with both increased expression size and with the number of sketches used. With 250 sketches, the relative error is around 20% or less. With 500 sketches, the relative error is less than 10%.

Figure 4B:
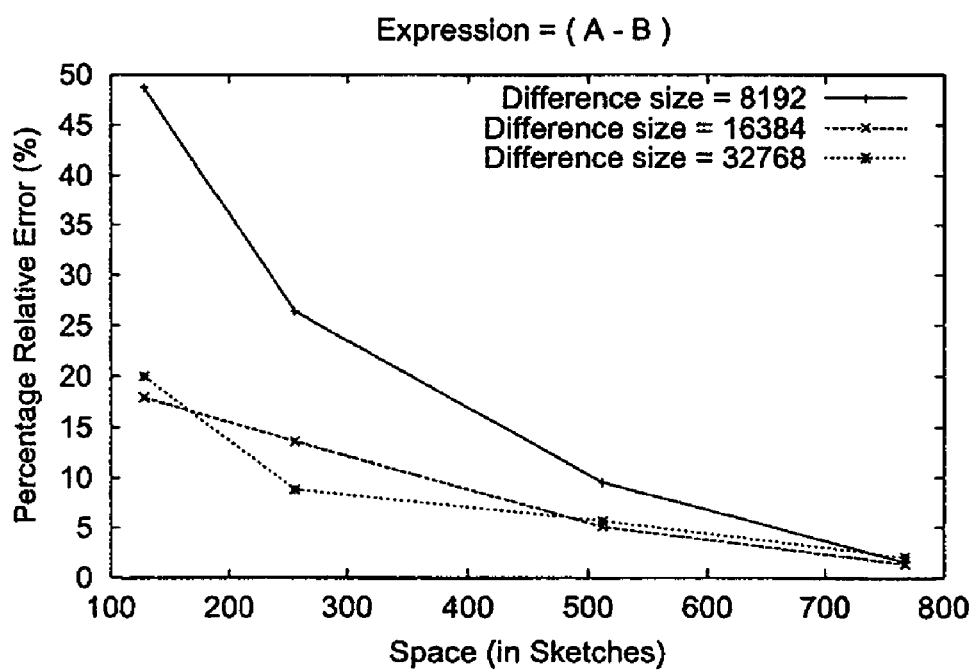
Figure 4C:
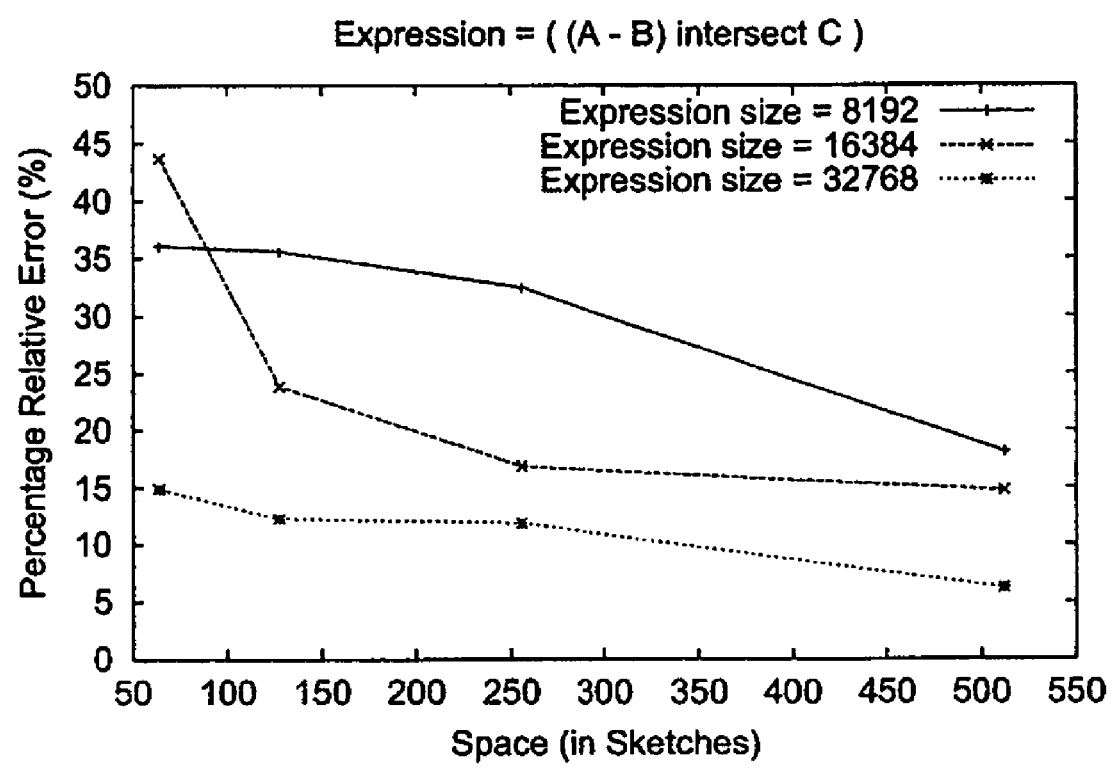

FIG. 4b shows experimental results of using the 2-level hash-sketches to estimate set-difference cardinality |A−B| between two data streams. The graph shows the relative error of the estimate plotted against the space used to store sketches, measured in sketches, for three different expression sizes.

FIG. 4b shows experimental results of using the 2-level hash-sketches to estimate set-expression cardinality |(A−B)∩C| between three data streams.

The above-described steps can be implemented using standard well-known programming techniques. Software programming code which embodies the present invention is typically stored in permanent memory of some type, such as permanent storage of a workstation located at Bell Labs of Lucent Technologies in Murry Hill, N.J. In a client/server environment, such software programming code may be stored in memory associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method of obtaining an estimate of a set-expression cardinality relating to at least a first and second data-stream, the method comprising the steps of:
   using a database management system comprising a computer for:
      creating a first hash-sketch synopsis for the first data stream and a second hash-sketch synopsis for the second data stream, each hash-sketch synopsis comprising a random hash-table and a 2-level hash sketch for each hash-bucket of said random hash-tables, said 2-level hash sketch comprising a first-level hash-table and a counter away for each hash-bucket of said first-level hash-table;
      pre-hashing said first and second data-streams into said first and second random hash tables, respectively;
      hashing individual buckets of said random hashing tables to the corresponding 2-level hash sketch for each of those buckets;
      maintaining said first and said second hash-sketch synopsis using one or more data elements from said first and second data-streams respectively;
      obtaining a set-expression singleton count over said first and second hash-sketch; and
      estimating said set-expression cardinality estimate using said set-expression singleton count.

2. The method of claim 1 wherein said maintaining said step of first and second hash-sketch synopsis comprises the steps of:
   randomly hashing said data element from the data-element domain to said random hash-bucket; and
   logarithmically hashing said data-element from said random hash-bucket to said first-level hash-bucket, and wherein the probability of logarithmically hashing said data-elements to said first-level hash-bucket decreases exponentially with the index of said first-level hash-bucket.

3. The method of claim 2 wherein said step of logarithmically hashing comprises mapping to a logarithmic hash-bucket using a least significant bit of a binary representation of a logarithmic hash image of said data-element.

4. The method of claim 3 wherein said 2-level hash structure counter allay comprises a total element count and one or more bit-location counts.

5. The method of claim 4 wherein said step of obtaining a set-expression singleton count over said first and second hash-sketch comprises the steps of:
   determining if said first-level hash bucket contains a singleton by comparing said total element count to one or more of said bit-location counts.

6. The method of claim 5 wherein said determining if said first level hash bucket contains a singleton further comprises checking if all of said bit-location counts are either zero or equal to said total element count.

7. The method of claim 2 wherein said set expression is a union of said first and second data-streams; and wherein said step of obtaining a set-expression singleton count over said first and second hash-sketch comprises the steps of:
   determining a smallest first-level hash-bucket index i at which the number of non-empty hash-buckets is less than or equal to a predetermined value; and
   generating a set-union cardinality estimate of said first and second data-streams using said index i and said number of none empty hash buckets.

8. The method of claim 7 wherein said number of non-empty hash-buckets is given by a count c of corresponding pairs of said first-level hash-buckets in which either hash-bucket is non-empty.

9. The method of claim 8 wherein said predetermined value is $(1+\epsilon)b/8$, where $\epsilon$ represents a relative error guarantee, b is the number of hash buckets in the random hash table; and wherein said estimate of cardinality of said union is $\log(1-c/b)/\log(1-1/2i1)$.

10. The method of claim 2 further comprises the step of:
   calculating an estimate of set-union cardinality over said first and second data-streams;

selecting an hash index level of said first-level hash-table using said estimate of set-union cardinality;

discovering a first number of said first-level hash-buckets at said hash index level which are singletons for set-union over said first and second data-streams;

counting a second number of said first-level hash-buckets at said hash index level which are set-union singletons and which are also set-expression witness elements for said first and second data streams; and using said set-union cardinality estimate and said first and second number of first-level hash-buckets to provide said set-expression cardinality estimate.

11. The method of claim 10 wherein said set-expression cardinality estimate is provided by said number of said set-union cardinality estimate multiplied by said second number of first-level hash buckets and divided by said first number of hash buckets.

12. The method of claim 11 wherein said set-expression witness elements are selected from said first-level hash-buckets having an index higher than the log of said set-union cardinality estimate; and wherein said corresponding pair of first-level hash-buckets are singleton-union and singleton set-expression hash-buckets.

13. The method of claim 12 wherein said set-expression is one of a set-difference and a set-intersection.

14. The method of claim 13 wherein said set-expression is a set-difference; and wherein said corresponding pair of first-level hash-buckets is a set-difference singleton by virtue of said first-level hash-bucket of said first data-stream being a singleton hash-bucket while said first-level hash-bucket of said second data stream is an empty hash-bucket.

15. The method of claim 13 wherein said set-expression is a set-intersection; and wherein said corresponding pair of first-level hash-buckets is a set-intersection singleton by virtue of both being a singleton hash-bucket.

16. The method of claim 2 wherein said first and second data-streams are update streams having data elements inserted and deleted.

17. A computer program product recorded on computer-readable storage medium for obtaining an estimate of a set-expression cardinality relating to two or more data-streams, comprising instructions for:

computer-readable means for creating a first hash-sketch synopsis for the first data stream and a second hash-sketch synopsis for the second data stream, each hash-sketch synopsis comprising a random hash-table and a 2-level hash sketch for each hash-bucket of said random hash-tables, said 2-level hash sketch comprising a first-level hash-table and a counter array for each hash-bucket of said first-level hash-table;

computer-readable means for pre-hashing said first and second data-streams into said first and second random hash tables, respectively;

computer-readable means for hashing individual buckets of said random hashing tables to the corresponding 2-level hash sketch for each of for those buckets;

computer-readable means for maintaining said first and said second hash-sketch synopsis using one or more data elements from said first and second data-streams respectively;

computer-readable means for obtaining a set-expression singleton count over said first and second hash-sketch; and computer-readable means for estimating said set-expression cardinality estimate using said set-expression singleton count.

* * * * *

UNITED STATES PATENT AND TRADEMARK OFFICE
CERTIFICATE OF CORRECTION

PATENT NO. : 7,596,544 B2 Page 1 of 1
APPLICATION NO. : 11/025355
DATED : September 29, 2009
INVENTOR(S) : Ganguly et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 832 days.

Signed and Sealed this

Twenty-eighth Day of September, 2010

David J. Kappos
*Director of the United States Patent and Trademark Office*